April 12, 1949.　　　　A. P. DAVIS　　　　2,466,763
TRANSMITTER FOR REPEATER SYSTEMS
Filed Dec. 21, 1945　　　　2 Sheets-Sheet 1

INVENTOR:
Arthur P. Davis
BY
ATTORNEYS

April 12, 1949. A. P. DAVIS 2,466,763
TRANSMITTER FOR REPEATER SYSTEMS
Filed Dec. 21, 1945 2 Sheets-Sheet 2

INVENTOR:
Arthur P. Davis
BY
ATTORNEYS

Patented Apr. 12, 1949

2,466,763

UNITED STATES PATENT OFFICE 2,466,763

TRANSMITTER FOR REPEATER SYSTEMS

Arthur P. Davis, New York, N. Y., assignor to Arma Corporation, Brooklyn, N. Y., a corporation of New York Application December 21, 1945, Serial No. 636,458

7 Claims. (Cl. 177—380)

1

This invention relates to a repeater system for the remote indication of angular values, and has particular reference to repeater compass transmission systems, although the invention is not limited to that particular use.

The directional element of a compass, whether of the magnetic or the gyroscopic type, is necessarily very delicately balanced to respond to the minute directive forces which cause it to give directional indications. For this reason, a direct drive from such a compass element of remote repeaters is not practicable and therefore it has been the custom to provide master compasses with electronic servo or follow-up systems for following the sensitive element, and then provide power to drive the transmitters which control the distant repeaters. However, in order to function without any appreciable reaction on the sensitive element, such servo-systems are inordinately elaborate, expensive and delicate, and therefore susceptible to damage and require much maintenance attention.

In accordance with the present invention, a simple, rugged and inexpensive servo-system, especially adaptable for compass repeater work or other purpose, is provided, which eliminates the objections to present systems. In a preferred embodiment of the invention, a magnetic element is supported to rotate freely in a conducting liquid contained in a receptacle having a series of contacts arranged on its inner peripheral surface and immersed in the liquid. On the outside of the receptacle, these contacts are connected together by a network of reactances having proportions calculated to prevent error in output and, at selected symmetrical points on this network, leads are taken off for transmission of angle-identifying currents to remote points for driving repeaters or other electrical receiver motors. Electric current is fed to the sensitive element through the liquid and is accordingly so apportioned through the contacts to the output terminals as to give them the proper well-known space-phased volage relations for angle indication commonly used in self-synchronous receivers, which may be of any suitable type.

For a more complete understanding of the invention, reference may be had to the accompanying drawings, in which.

2

Figure 1:
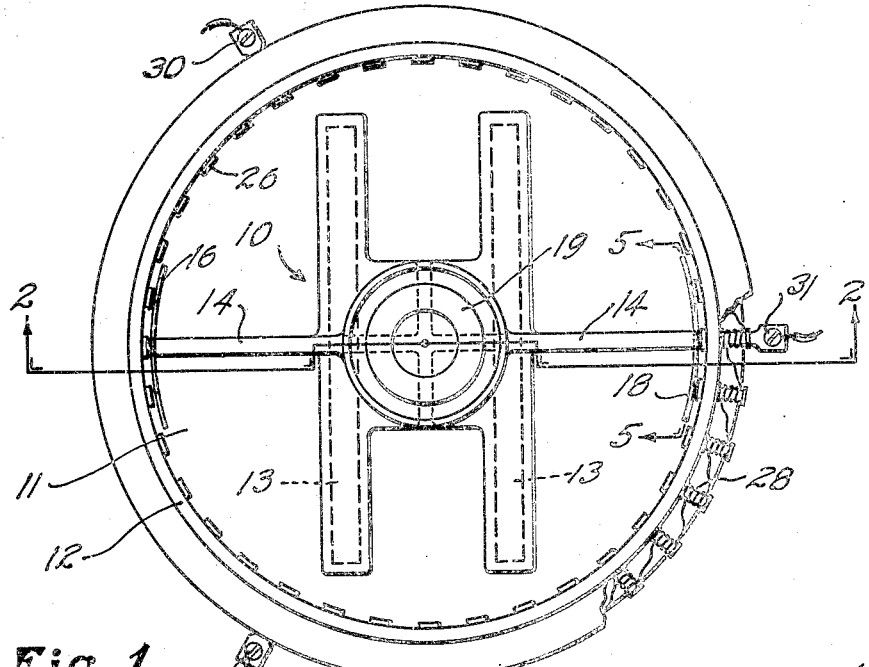
Figure 1 is a plan view of the interior of one form of the invention as applied to a magnetic compass with the cover removed along the line 1—1 of Fig. 2.
Figure 5:
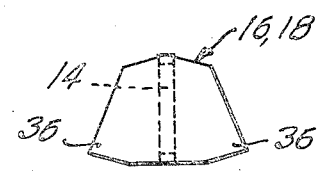
Figures 3, 4:
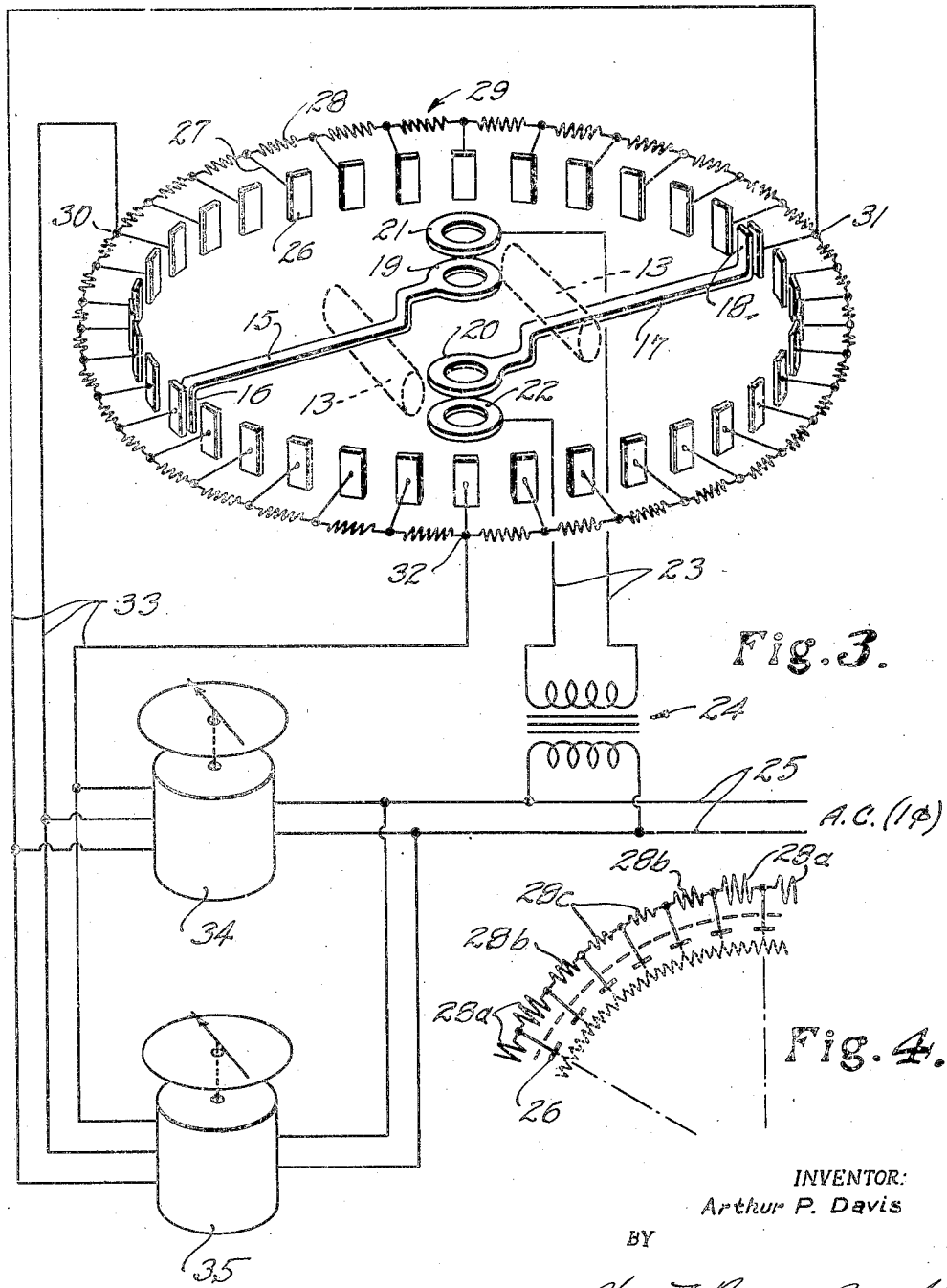

Fig. 3 is a combination perspective view of the essential mechanical parts and an electrical diagram of the invention, for use in explanation of its action;

Fig. 4 is a fragmentary electrical diagram of the arrangement for preventing output distortion; and, Fig. 5 illustrates a preferred form of the contact armatures of the directionable element, as seen along line 5—5 of Fig. 1.

Referring to Fig. 1 of the drawings, numeral 10 designates the directive unit which is represented as a permanent magnet compass element rotatable about vertical pivots and floating within a body of conducting liquid or electrolyte 11 contained in stationary receptacle 12. Element 10 includes a frame, preferably formed of plastic material, such as a phenolic resin, having suitable buoyancy chambers and housing a pair of bar magnets 13. Arranged at right angles to the magnets 13 are radial fins 14 acting on the liquid 11 as damping fins.

The upper edge of one of the fins 14 is fitted with a thin strip conductor 15 ending in the armature or electrode 16, while the lower edge of the other fin 14 is fitted with a strip conductor 17 terminating in an electrode 18, as shown especially in Fig. 3. Both of these conductors 15 and 17 terminate at the center of the assembly in metal rings 19 and 20 as shown in Fig. 3, these rings being isolated from each other as far as possible in the liquid 11, although each ring is spaced as closely as possible to a similar conducting ring on the stationary parts of the assembly. Thus, movable ring 19 is close to stationary ring 21 on the cover 12' and movable ring 20 is close to stationary ring 22 on receptacle 12.

The rings, 21 and 22, are connected as shown by wires 23 to a transformer 24, which is energized from the alternating current service leads 25, so that the armatures 16 and 18 are supplied with electric power, preferably single phase alternating current through transformer 24, rings 21 and 22, electrolyte 11, rings 19 and 20, and respective conductors 15 and 17 to electrodes 16 and 18, which are preferably of extended area and shape shown in Figs. 1 and 5, the purpose of which will be explained. The single phase alternating current thus fed to electrodes 16 and 18 precludes electrolytic deposits in the manner described in detail in copending patent application Serial No. 597,178, filed June 2, 1945, by applicant, now abandoned.

Immersed in the contained liquid 11 and uniformly spaced around the inner wall of the stationary receptacle are the series of contacts 26, which are close to but not in contact with electrodes 16 and 18 when overlapped thereby, as shown especially in Figs. 1 and 3. Any required number of such contacts 26 may be employed, such as the thirty-six shown, spaced ten degrees apart. The contacts 26 are connected to one end of corresponding wires 27 passing through the wall of the receptacle 12 and joined together as shown by thirty-six reactance units 28 arranged in the circular series 29. At chosen symmetrical points on this series 29, such as points 30, 31 and 32 spaced one hundred and twenty degrees apart, leads 33 are attached to transmit the resultant space-phased currents to remote repeater receivers, two of which are shown at 34 and 35 supplied with electrical power by connection to the service leads 25.

Inasmuch as the service leads 25 also supply voltage for the two electrodes 16 and 18 which travel around in the electrolyte 11, the desirable condition is obtained in the arrangement of this invention which is inherent in the best self-synchronous transmissions, viz., that no current flows from transmitter to receiver when their indications are in agreement, since the space-phased voltages apportioned by the transmitter to leads 33 are exactly balanced by those generated in the repeaters 34 and 35, as is well understood in self-synchronous systems.

In this way, the current energy dissipated in the electrolyte 11 of the transmitter in heat and electrolysis is reduced to that represented by the unavoidable stray or leakage current therein, and the current in the reactance network. Such leakage current is reduced to a minimum by making the leakage paths, especially those between points of relatively high potential difference, as long as possible by placing such parts remote from each other and by making the current paths between them as tortuous as practicable, as shown in Fig. 1.

Since leakage of electrical current also occurs between any one of the contacts 26 and every other one of them in an amount proportional to the difference in potential in each case and, since these currents obviously have a complicated relation to the angular position of the electrodes 16 and 18, it has been found desirable to provide for a certain relation between the ohmic value of the various individual resistances 28 of the network group 29. Such a special arrangement is illustrated in Fig. 4, in which one of the six parts of the network resistances 29, being a three-phase system, is shown as comprising six resistors 28 of the thirty-six resistance system shown.

Each such six-resistor group is then split into two sections, the units of which are similar but arranged in reverse order, as shown in the drawing, so that the units 28a, for instance, have an ohmic value of 19 ohms in one arrangement, the next two resistances 28b, have the lesser ohmic value of 18 ohms, and the final two resistances 28c, have the value of 17 ohms. This group of six values is repeated, as has been stated, six times around the complete circle of the network 29 and the total assembly in use brings about true sine form output voltages in the leads 33 as functions of the angle of the directive element 10 with respect to the terminals 30, 31 and 32.

Figure 2:
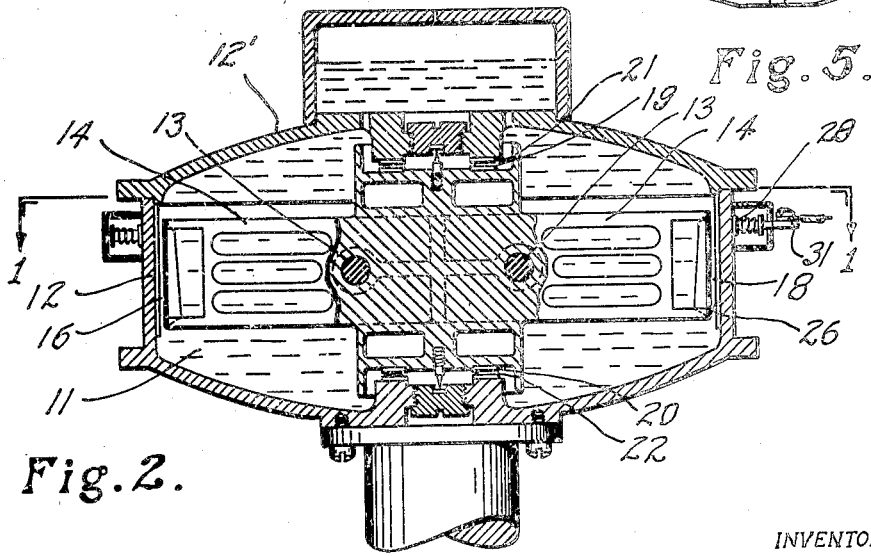
Fig. 2 is an axial section through the same, as seen along the line 2—2 of Fig. 1.

As above stated, in the preferred arrangement thirty-six contacts are used and if the electrodes 16 and 18 cooperating with these contacts are rectangular in shape and about the same proportions as the contacts 26 as shown in Fig. 3, for example, then there appears a ripple in the output voltages which may cause the repeater pointers to vibrate. This ripple may be raised in frequency and decreased in amplitude by increasing the number of contacts 26, but this expedient leads to manufacturing complications, and it is therefore preferred not to increase the number of contacts. This condition is corrected by specially shaping the two electrodes 16 and 18 as shown in Fig. 5, and making the electrodes of increased width in order to overlap several contacts 26 in the liquid 11, as shown in Figs. 1 and 2. The pointed ends 36 of the electrodes 16 and 18 serve to vary the currents passing from the electrodes 16, 18 to the neighboring contacts 26 in a smooth and uninterrupted manner as the electrodes pass by the contacts 26. The shape shown in Fig. 5 has been found to produce substantially ripple-free outputs on the leads 33.

The operation of the self-synchronous compass repeater system of this invention is readily understood from the foregoing description and may be summarized as follows: North-seeking movements of directional element 10 about its vertical axis result in relative movement between the same and receptacle 12, thus causing electrodes 16 and 18 to overlap a different opposite group of contacts 26 spaced therefrom by the thin intervening layer of electrolyte 11.

Inasmuch as the resistor series relations between the input at 21 and 22, the armatures 16 and 18, the electrolyte 11 intervening between the latter and the overlapped conductors 26, and the output across terminals 30, 31 and 32 varies, the effective voltage values $E_1$, $E_2$ and $E_3$ of the three segments of the network 29 between points 30, 31 and 32 change, and the resulting space-phased currents peculiar to that angular position of compass element 10 are fed to repeaters 34 and 35, whose pointers or cards accordingly indicate the compass direction in the usual way. As indicated, the voltages $E_1$, $E_2$ and $E_3$ have the proper space-phased voltage relations for angle indication commonly used in self-synchronous receivers, namely:

$E_1 = E \sin \alpha$
$E_2 = E \sin (\alpha + 120°)$
$E_3 = E \sin (\alpha + 240°)$ where E is the maximum output voltage across any two of the terminals 30, 31 and 32 and $\alpha$ is the angular position of the compass element 10. As stated, by properly proportioning the ohmic resistances of the resistors 28, the preferred true sine form output voltages appear in the leads 33, and ripple-free output is obtained by employing the specially-shaped electrodes shown in Fig. 5 without requiring an inordinately great number of contacts 26 to secure smooth operation. In these ways a simple and rugged repeater system is provided for compasses, whether of the magnetic, gyroscopic or combined magnetic and gyroscopic types. Obviously inductances could also be used.

Although a preferred embodiment of the invention has been illustrated and described herein, it is to be understood that the invention is not limited thereby but is susceptible of changes in form and detail within the scope of the appended claims.

I claim:

1. In electromechanical transmitting apparatus, the combination of a container, an electrolyte in said container, spaced stationary electrodes in said container in electrical contact with said electrolyte, an electrical network interconnecting said electrodes, spaced terminals on said network, an angularly directable element having spaced electrodes electrically contacting said electrolyte for cooperation with said stationary electrodes through the conducting path afforded by said electrolyte, and a source of single-phase electrical power connected to said directable element electrodes, whereby each angular position of said directable element is accompanied on said terminals with a group of voltage values which is peculiar to each said angular position.

2. In electromechanical transmitting apparatus, the combination of a container, an electrolyte therein, stationary electrodes spaced circularly around the interior of said container and in electrical contact with said electrolyte, resistances interposed between adjacent stationary electrodes and connected in series to form a resistance network, spaced terminals on said network, at least one movable electrode mounted for movement in spaced relation with said stationary electrodes about the center of the circle thereof and cooperating electrically therewith through said electrolyte, a current-receiving terminal remote from said movable electrode and in contact with said electrolyte, electrical connections between said terminal and movable electrode, and a stationary current-transmitting terminal mounted on said container in closely spaced relation with said current-receiving terminal and in contact with said electrolyte for supplying current thereto through said electrolyte.

3. In electromechanical transmitting apparatus, the combination of a container, an electrolyte therein, stationary electrodes spaced circularly around the interior of said container and in electrical contact with said electrolyte, resistances interposed between adjacent stationary electrodes and connected in series to form a resistance network, spaced terminals on said network, a supporting member rotatively mounted about the center of the circle of said stationary electrodes, at least one movable electrode mounted on said member for movement in spaced relation with said stationary electrodes about the center of the circle thereof and cooperating electrically therewith through said electrolyte, a current-receiving terminal mounted on said member remote from said movable electrode and in contact with said electrolyte, electrical connections between said terminal and movable electrode, and a stationary current-transmitting terminal mounted on said container in closely spaced relation with said current-receiving terminal and in contact with said electrolyte for supplying current thereto through said electrolyte.

4. In electromechanical transmitting apparatus, the combination of a container having a conducting fluid therein, stationary electrodes spaced circularly around the interior of said container and in electrical contact with said conducting fluid, resistances interposed between adjacent stationary electrodes and connected in series to form a resistance network, three spaced apart terminals on said network, a pair of spaced apart, movable electrodes mounted for movement in spaced relation with said stationary electrodes about the center of the circle thereof and cooperating electrically therewith through said electrolyte, and a source of alternating current connected to said pair of movable electrodes, said resistors, terminals and movable electrodes being so arranged that the three voltages $E_1$, $E_2$ and $E_3$ developed between said three terminals are in accordance with the following laws:

$E_1 = E \sin \alpha$
$E_2 = E \sin (\alpha + 120°)$
$E_3 = E \sin (\alpha + 240°)$ where E is the maximum output voltage across any two of said terminals and $\alpha$ is the angular displacement of said pair of spaced apart electrodes from a reference position.

5. In electromechanical transmitting apparatus, the combination of a container having a conducting fluid therein, stationary electrodes spaced circularly around the interior of said container and in electrical contact with said conducting fluid, resistances interposed between adjacent stationary electrodes and connected in series to form a resistance network, three spaced apart terminals on said network, a pair of spaced apart, movable electrodes mounted for movement in spaced relation with said stationary electrodes about the center of the circle thereof and cooperating electrically therewith through said electrolyte, each of said movable electrodes having a width sufficient to overlap simultaneously two or more of said stationary electrodes, and a source of alternating current connected to said pair of movable electrodes, said resistors, terminals and movable electrodes being so arranged that the three voltages $E_1$, $E_2$ and $E_3$ developed between said three terminals are in accordance with the following laws:

$E_1 = E \sin \alpha$
$E_2 = E \sin (\alpha + 120°)$
$E_3 = E \sin (\alpha + 240°)$ where E is the maximum output voltage across any two of said terminals and $\alpha$ is the angular displacement of said pair of spaced apart electrodes from a reference position.

6. In electromechanical transmitting apparatus, the combination of a container having a conducting fluid therein, stationary electrodes spaced circularly around the interior of said container and in electrical contact with said conducting fluid, resistances interposed between adjacent stationary electrodes and connected in series to form a resistance network, three spaced apart terminals on said network, the values of said resistances being selected to vary progressively so as to prevent wave form distortion in the transmission, a pair of spaced apart, movable electrodes mounted for movement in spaced relation with said stationary electrodes about the center of the circle thereof and cooperating electrically therewith through said electrolyte, each of said movable electrodes having a width sufficient to overlap simultaneously two or more of said stationary electrodes and varying uniformly in surface area from a relatively small value at the outer edges to a larger value intermediate the outer edges, and a source of alternating current connected to said pair of movable electrodes, said resistors, terminals and movable electrodes being so arranged that the three voltages, $E_1$, $E_2$ and $E_3$ developed between said three terminals are in accordance with the following laws:

$E_1 = E \sin \alpha$
$E_2 = E \sin (\alpha + 120°)$
$E_3 = E \sin (\alpha + 240°)$ where E is the maximum output voltage across any two of said terminals and $\alpha$ is the angular displacement of said pair of spaced apart electrodes from a reference position.

7. In electromechanical transmitting apparatus, the combination of a container having a conducting fluid therein, stationary electrodes spaced circularly around the interior of said container and in electrical contact with said conducting fluid, resistances interposed between adjacent stationary electrodes and connected in series to form a resistance network, three spaced apart terminals on said network, a pair of spaced apart, movable electrodes mounted for movement in spaced relation with said stationary electrodes about the center of the circle thereof and cooperating electrically therewith through said electrolyte, a pair of current receiving terminals remote from said respective movable electrodes and in contact with said electrolyte, electrical connections between said current receiving terminals and said respective movable electrodes, and a pair of stationary current transmitting terminals mounted on said container in closely spaced relation with the current receiving terminals, respectively, and in contact with said electrolyte for supplying current to said current receiving terminals through said electrolyte, said resistors, terminals and movable electrodes being so arranged that the three voltages $E_1$, $E_2$ and $E_3$ developed between said three terminals are in accordance with the followings laws:

$E_1 = E \sin \alpha$
$E_2 = E \sin (\alpha + 120°)$
$E_3 = E \sin (\alpha + 240°)$ where $E$ is the maximum output voltage across any two of said terminals and $\alpha$ is the angular displacement of said pair of spaced apart electrodes from a reference position.

ARTHUR P. DAVIS.

REFERENCES CITED

The following references are of record in the file of this patent:

UNITED STATES PATENTS

| Number | Name | Date |
|---|---|---|
| 877,311 | Evershed | Jan. 21, 1908 |
| 1,991,129 | Urfer | Feb. 12, 1935 |
| 2,248,889 | Mueller | July 8, 1941 |
| 2,372,002 | Kelly | Mar. 20, 1945 |
| 2,396,244 | Borsum | Mar. 12, 1946 |

FOREIGN PATENTS

| Number | Country | Date |
|---|---|---|
| 228,166 | Great Britain | Apr. 20, 1926 |
| 250,830 | Germany | Sept. 18, 1912 |
| 567,240 | France | Dec. 4, 1923 |
| 601,844 | France | Dec. 11, 1925 |
| 694,427 | Germany | Aug. 1, 1940 |
| 782,073 | France | Mar. 11, 1935 |